United States Patent
Interlandi et al.

(10) Patent No.: US 11,922,315 B2
(45) Date of Patent: Mar. 5, 2024

(54) NEURAL ADAPTER FOR CLASSICAL MACHINE LEARNING (ML) MODELS

(71) Applicant: Microsoft Technology Licensing, LLC, Redmond, WA (US)

(72) Inventors: Matteo Interlandi, Seattle, WA (US); Byung-Gon Chun, Redmond, WA (US); Markus Weimer, Kirkland, WA (US); Gyeongin Yu, Redmond, WA (US); Saeed Amizadeh, Seattle, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 1148 days.

(21) Appl. No.: 16/551,615

(22) Filed: Aug. 26, 2019

(65) Prior Publication Data
US 2021/0065007 A1    Mar. 4, 2021

(51) Int. Cl.
*G06N 3/084* (2023.01)
*G06F 16/901* (2019.01)
(Continued)

(52) U.S. Cl.
CPC ......... *G06N 3/084* (2013.01); *G06F 16/9027* (2019.01); *G06N 20/00* (2019.01); *G06T 1/20* (2013.01)

(58) Field of Classification Search
CPC .... G06N 3/084; G06N 20/00; G06F 16/9027; G06T 1/20
See application file for complete search history.

(56) References Cited

U.S. PATENT DOCUMENTS 7,324,979 B2    1/2008   Butler et al.
10,417,577 B2 *  9/2019  Bowers .................. G06F 9/453
(Continued)

FOREIGN PATENT DOCUMENTS

WO    2018119035 A1    6/2018

OTHER PUBLICATIONS

"Build a Convolutional Neural Network using Estimators", Retrieved from: https://web.archive.org/web/20190130121124/https:/www.tensorflow.org/tutorials/estimators/cnn, Jan. 30, 2019, 17 Pages.
(Continued)

*Primary Examiner* — Abderrahim Merouan
(74) *Attorney, Agent, or Firm* — Foley IP Law, PLLC (57) ABSTRACT

Solutions for adapting machine learning (ML) models to neural networks (NNs) include receiving an ML pipeline comprising a plurality of operators; determining operator dependencies within the ML pipeline; determining recognized operators; for each of at least two recognized operators, selecting a corresponding NN module from a translation dictionary; and wiring the selected NN modules in accordance with the operator dependencies to generate a translated NN. Some examples determine a starting operator for translation, which is the earliest recognized operator having parameters. Some examples connect inputs of the translated NN to upstream operators of the ML pipeline that had not been translated. Some examples further tune the translated NN using backpropagation. Some examples determine whether an operator is trainable or non-trainable and flag related parameters accordingly for later training. Some examples determine whether an operator has multiple corresponding NN modules within the translation dictionary and make an optimized selection.

20 Claims, 8 Drawing Sheets

(51) Int. Cl.
  G06N 20/00     (2019.01)
  G06T 1/20      (2006.01)

(56) References Cited

U.S. PATENT DOCUMENTS

| | | | |
|---|---|---|---|
| 10,459,849 B1* | 10/2019 | Shorb | G06F 11/3034 |
| 10,643,144 B2* | 5/2020 | Bowers | G06N 20/00 |
| 11,449,686 B1* | 9/2022 | Panchal | G06F 40/51 |
| 2016/0358103 A1* | 12/2016 | Bowers | G06F 9/4881 |
| 2017/0193066 A1* | 7/2017 | Zhu | G06F 16/254 |
| 2017/0220925 A1* | 8/2017 | Alsharif | G06N 3/08 |
| 2019/0325095 A1* | 10/2019 | Lekivetz | G06N 20/00 |
| 2019/0325352 A1* | 10/2019 | Tsai | G06F 16/282 |
| 2019/0346297 A1* | 11/2019 | Lekivetz | G06F 11/079 |
| 2019/0354809 A1* | 11/2019 | Ralhan | G06F 16/116 |
| 2019/0370393 A1* | 12/2019 | Finch | G06F 16/3338 |
| 2019/0391796 A1* | 12/2019 | Brady | G06F 8/456 |
| 2020/0211231 A1* | 7/2020 | Brownlee | G06T 15/20 |
| 2020/0272909 A1* | 8/2020 | Parmentier | G06N 20/00 |
| 2021/0065007 A1* | 3/2021 | Interlandi | G06T 1/20 |

OTHER PUBLICATIONS

"Bureau of Transportation Statistics", Retrieved from: https://www.bts.gov/, Retrieved Date: Apr. 15, 2019, 4 Pages.

"Kaggle", Retrieved from: https://www.kaggle.com/, Retrieved Date: Apr. 15, 2019, 4 Pages.

"Kaggle Display Advertising Challenge Dataset", Retrieved from: http://labs.criteo.com/2014/02/kaggle-display-advertising-challenge-dataset/, Feb. 10, 2014, 4 Pages.

Abadi, et al., "TensorFlow: A System for Large-scale Machine Learning", In Proceedings of the 12th USENIX Symposium on Operating Systems Design and Implementation, Nov. 2, 2016, pp. 265-283.

Amizadeh, et al., "Making Classical Machine Learning Pipelines Differentiable: A Neural Translation Approach", Retrieved from https://arxiv.org/pdf/1906.03822.pdf, Jun. 10, 2019, 9 Pages.

Banerjee, Arunava, "Initializing neural networks using decision trees", In Proceedings of the International Workshop on Computational Learning and Natural Learning Systems, 1994, 14 Pages.

Biau, et al., "Neural Random Forests", In Repository of arXiv.org, arXiv: 1604.07143, Jun. 21, 2018, 42 Pages.

Bicici, et al., "Branching Neural Networks", In Technical Disclosure Commons, Jun. 12, 2018, 11 Pages.

Bossan, et al., "skorch", Retrieved from: https://github.com/skorch-dev/skorch, Retrieved Date: Apr. 15, 2019, 4 Pages.

Candel, et al., "H2O", Retrieved from: https://web.archive.org/web/20190503134555/https:/github.com/h2oai/h2o-3, May 3, 2019, 16 Pages.

Chen, et al., "Pipelined Back-Propagation for Context-Dependent Deep Neural Networks", In the Proceedings of the 13th Annual Conference of the International Speech Communication Association, Sep. 9, 2012, 4 Pages.

Craven, et al., "Extracting tree-structured representations of trained networks", In Proceedings of the 8th International Conference on Neural Information Processing Systems, Nov. 27, 1995, pp. 24-30.

Duvenaud, et al., "Convolutional Networks on Graphs for Learning Molecular Fingerprints", In Journal of Advances in neural information processing systems, Dec. 7, 2015, 9 Pages.

Elsken, et al., "Neural architecture search: A survey", In Repository of arXiv.org,arXiv:1808.05377, Aug. 2018, 21 Pages.

Han-Chen, et al., "Hyperlearn", Retrieved from: https://web.archive.org/web/20181120010821/https:/github.com/danielhanchen/hyperlearn, Nov. 20, 2018, 3 Pages.

Hassan, et al., "Achieving human parity on automatic chinese to english news translation", In Repository of arXiv.org , arXiv:1803.05567, Mar. 15, 2018, pp. 1-25.

Hermann, et al., "Meet Michelangelo: Uber's Machine Learning Platform", Retrieved from: https://eng.uber.com/michelangelo/, Sep. 5, 2017, 14 Pages.

Huang, et al., "GPipe: Efficient Training of Giant Neural Networks using Pipeline Parallelism", In Repository of arXiv.org,arXiv:1811.06965, Nov. 16, 2018, 11 Pages.

Humbird, et al., "Deep neural network initialization with decision trees", In Journal of IEEE Transactions on Neural Networks and Learning Systems, vol. 30, Issue 5, Oct. 1, 2018, 10 Pages.

Ivanova, et al., "Initialization of neural networks by means of decision trees", In Journal of Knowledge Based Systems, vol. 8, Issue 6, Dec. 1995, pp. 333-344.

Juan, et al., "ycjuan/kaggle-2014-criteo", Retrieved from: https://github.com/ycjuan/kaggle-2014-criteo, Retrieved Date: Apr. 15, 2019, 3 Pages.

Ke, et al., "Lightgbm: A highly efficient gradient boosting decision tree", In Proceedings of 31st Conference on Neural Information Processing Systems, Dec. 4, 2017, 9 Pages.

Kingma, et al., "Adam: A method for stochastic optimization", In Proceedings of the 3rd International Conference on Learning Representations, Dec. 22, 2014, 15 Pages.

Le, et al., "On optimization methods for deep learning", In Proceedings of the 28th International Conference on International Conference on Machine Learning, Jun. 28, 2011, 8 Pages.

Lee, et al., "On Model Parallelization and Scheduling Strategies for Distributed Machine Learning", In Journal of Advances in neural information processing systems, Dec. 8, 2014, 9 Pages.

McKinney, Wes, "Pandas: a Foundational Python Library for Data Analysis and Statistics", In Python for High Performance and Scientific Computing, Nov. 18, 2011, 9 Pages.

Meng, et al., "MLlib: Machine Learning in Apache Spark", In Journal of Machine Learning Research, vol. 17, Issue 1, Jan. 1, 2016, 7 Pages.

Moschitti, Alessandro, "Updating Neural Networks to Recognize New Categories, with Minimal Retraining", Retrieved from: https://developer.amazon.com/blogs/alexa/post/6058f7e9-1de8-4e51-8f50-aee56e29f3ce/updating-neural-networks-to-recognize-new-categories-with-minimal-retraining, Jan. 30, 2019, 5 Pages.

Paszke, et al., "Automatic differentiation in PyTorch", In Proceedings of 31st Conference on Neural Information Processing Systems, Dec. 4, 2017, 4 Pages.

Pedregosa, et al., "Scikit-learn: Machine learning in Python", In Journal of Machine Learning Research, vol. 12, Oct. 2011, pp. 2825-2830.

Ramalingam, et al., "Open Neural Network Exchange—ONNX", Retrieved from: https://github.com/onnx/onnx/blob/master/docs/IR.md, Jun. 21, 2019, 16 Pages.

Rountree, Nathan, "Initialising Neural Networks with Prior Knowledge", In Thesis of University of Otago, Sep. 2006, 210 Pages.

Russakovsky, et al., "ImageNet Large Scale Visual Recognition Challenge", In International Journal of Computer Vision, vol. 115, Issue 3, Dec. 2015, pp. 211-252.

Shalev-Shwartz, et al., "Stochastic dual coordinate ascent methods for regularized loss", In Journal of Machine Learning Research, vol. 14, Feb. 2013, 33 Pages.

Siddiqui, et al., "ml.net", Retrieved from: https://github.com/dotnet/machinelearning, Retrieved Date: Apr. 15, 2019, 4 Pages.

Takac, et al., "Distributed mini-batch SDCA", In Journal of Computing Research Repository, Jul. 2015, 15 Pages.

Visneski, Ana, "Introducing Gluon: a new library for machine learning from AWS and Microsoft", Retrieved from: https://aws.amazon.com/blogs/aws/introducing-gluon-a-new-library-for-machine-learning-from-aws-and-microsoft/, Oct. 12, 2017, 5 Pages.

Walt, et al., "The NumPy Array: A Structure for Efficient Numerical Computation", In Journal of Computing in Science & Engineering vol. 13, Issue 2, Mar. 14, 2011, 8 Pages.

Zhou, et al., "Nec4.5: neural ensemble based c4.5", In Journal of IEEE Transactions on Knowledge and Data Engineering, vol. 16, Issue 6, May 2004, 5 Pages.

Komaki, "Talkingdata adtracking fraud detection challenge's winner solution", Retrieved from: https://www.kaggle.com/c/talkingdata-adtracking-fraud-detection/discussion/56475, May 8, 2018, 12 Pages.

* cited by examiner

NEURAL ADAPTER FOR CLASSICAL MACHINE LEARNING (ML) MODELS

BACKGROUND

Neural networks (NNs) have been used successful in various fields such as computer vision and natural language processing, however, classical machine learning (ML) models are still popular, partially due to familiarity by practitioners and the maturity of associated toolsets. It is common to construct ML pipelines by combining an ensemble of ML models (e.g., trained operators) with multiple data transforms to perform a more comprehensive task than the ML models and transforms can accomplish individually. The result is a directed acyclic graphs (DAG) of operators with a structure of dependencies.

It is common for ML pipelines to include more than one trainable operator (e.g., ML models or data transforms that determine how to process input by learning from a training dataset). Trainable operators are often trained sequentially, in a greedy fashion, by following the topological order specified in the DAG (e.g., the dependencies). Although the toolsets for such a training scheme are mature, sequential training of ML pipelines' operators can be sub-optimal, because training in isolation does not result in joint optimization.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to solutions for adapting machine learning (ML) models to neural networks (NNs) that include receiving an ML pipeline comprising a plurality of operators; determining operator dependencies within the ML pipeline; determining recognized operators; for each of at least two recognized operators, selecting a corresponding NN module from a translation dictionary; and wiring the selected NN modules in accordance with the operator dependencies to generate a translated NN. Some examples determine a starting operator for translation, which is the earliest recognized operator having parameters. Some examples connect inputs of the translated NN to upstream operators of the ML pipeline that had not been translated. Some examples further tune the translated NN using backpropagation. Some examples determine whether an operator is trainable or non-trainable and flag related parameters accordingly for later training. Some examples determine whether an operator has multiple corresponding NN modules within the translation dictionary and make an optimized selection.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

With classical machine learning (ML) pipelines, models are trained and scored separately one after another in a greedy fashion. Classical ML models include logistic regression, decision trees, random forests, and others. There is often more than one learner, and each model is defined by its own prediction function, loss, and algorithm for training. Unlike the typical training for ML pipelines, however, neural networks (NNs) are often trained in an end-to-end fashion, using backpropagation. This is because NN layers are effectively a set of cascaded operators, enabling parameters to be globally estimated to reach superior (local) error minima. A single loss function can be used for the whole network, and similarly, a single algorithm can be used for training. Prediction functions are typically represented by linear algebra.

In general, NNs are universal function approximators and thus, most computations can be approximated with an NN. In some scenarios, however, NN performance can be limited with certain data types such as schema class data associated with SQL databases or spreadsheets, because decision trees tend to dominate with structured data. Additionally, custom hardware can efficiently evaluate NNs, and NNs can be deployed to a graphics processing unit (GPU). Further, NNs operate relatively well distributed manner, enabling the handling of larger data sets on parallel nodes. Thus, in some examples, translation is used to facilitate distributed training. In general NNs are computationally simpler than many classical ML models, and benefit from mature accelerators and toolsets for parallelization. In some examples, translated models are used for predictions (e.g., used for inference.

Therefore, some aspects disclosed herein are directed to solutions for adapting ML models to NNs that include receiving an ML pipeline comprising a plurality of operators; determining operator dependencies within the ML pipeline; determining recognized operators; for each of at least two recognized operators, selecting a corresponding NN module from a translation dictionary; and wiring the selected NN modules in accordance with the operator dependencies to generate a translated NN. Some examples determine a starting operator for translation, which is the earliest recognized operator having parameters. Some examples connect inputs of the translated NN to upstream operators of the ML pipeline that had not been translated. Some examples further tune the translated NN using backpropagation. Some examples determine whether an operator is trainable or non-trainable and flag related parameters accordingly for later training. Some examples determine whether an operator has multiple corresponding NN modules within the translation dictionary and make an optimized selection.

ML pipelines, developed with classical mature ML toolkits can be translated into NNs for improved training and scoring. That is, a single end-to-end training scheme replaces individual, disjointed greedy training to potentially improve accuracy and runtime. Thus, aspects of the disclosure operate in an unconventional way to improve machine-aided analysis and decision-making algorithms, by leveraging the advantages of NN end-to-end training and distributed deployment along with the maturity of classical ML model development, availability, and toolset maturity. In this manner, NNs can be used to solve classical ML system problems.

The disclosed framework not only unlocks the possibility to collectively fine tune ensemble models using backpropagation, but provides additional benefits regarding model inference and parallel training. By translating classical ML models into NN representations, only one framework (the NN) requires support for inference and parallel training. This avoids the re-implementation of algorithms specifically for inference and distributed processing. Additionally, accelerators such as GPUs can be leveraged. Once an ensemble of ML models is trained using a classical framework, it can be translated into an NN and backpropagation used to fine tune it in an end-to-end fashion. In this manner, ensemble models are trained collectively, rather than in isolation, thereby potentially providing superior accuracy. When a training dataset is too large to fit into a single node, rather than implementing a distributed version of the classical ML algorithms, a novel approach is possible: the classical ML models are pre-trained on a single node using a portion of the training data, the ML models are translated, and training is finished using a parallel NN deployment.

Figure 1:
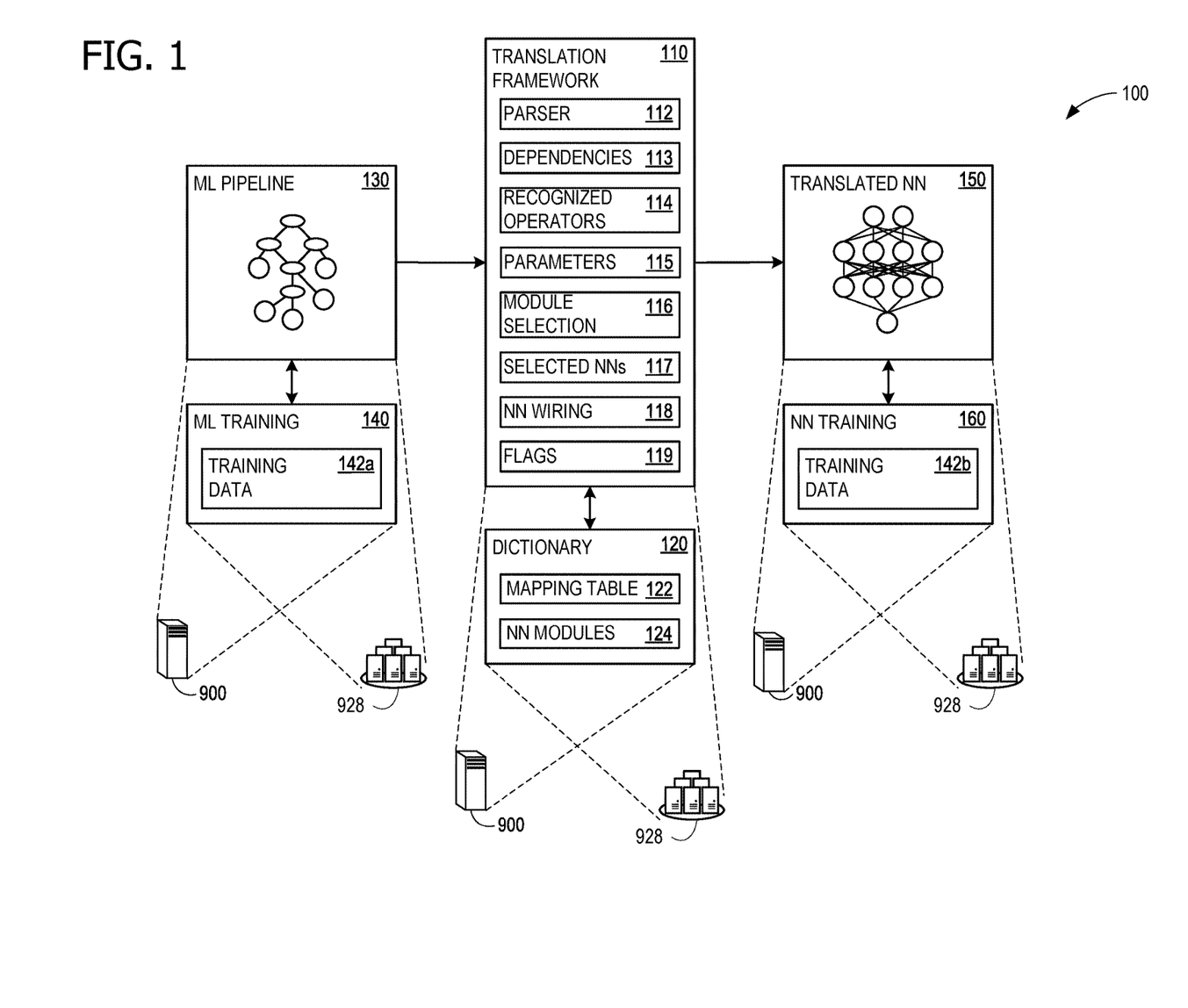
FIG. 1 illustrates a framework for adapting machine learning (ML) models to neural networks (NNs)

FIG. 1 illustrates an arrangement 100 that includes a translation framework 110 for adapting ML models to NNs. In arrangement 100, translation framework 110 receives an ML pipeline 130 comprising a plurality of operators (see FIG. 3 for additional detail); determines operator dependencies 113 within ML pipeline 130, determines a plurality of recognized operators 114 within the plurality of operators; for each of at least two recognized operators 114, selects a corresponding NN module (using a module selection component 116) from a translation dictionary 120 (e.g., from set of NN modules 124); and wires the selected NN modules 117 (using an NN wiring component 118) in accordance with operator dependencies 113 to generate a translated NN 150. Initial training (e.g., pre-training) of ML pipeline 130 is accomplished using an ML training component 140 and training data 142a. Further training (e.g., fine tuning) of translated NN 150 is accomplished using an NN training component 160 and training data 142b. In some examples, training data 142a and 142b are different portions of a common training data set. Any of translation framework 110, translation dictionary 120, ML pipeline 130, ML training component 140, translated NN 150, and NN training component 160 may be hosted and executed on a computing device 900 and/or a cloud resource 928. Computing device 900 and cloud resource 928 may include GPUs and are described in further detail in relation to FIG. 9. The structures of ML pipeline 130, translation dictionary 120, and translated NN 150 are shown in more detail in FIGS. 3, 4, and 5, respectively.

Translation framework 110 includes a parser 112 that parses ML pipeline 130 to determine operator dependencies 113 within ML pipeline 130 and also determine a plurality of recognized operators 114 within the plurality of operators of ML pipeline 130. Operators are recognized when they have an entry in translation dictionary 120. Dependencies 113 indicate a directed acyclic graph (DAG) structure where vertices represent operations and edges represent data dependencies. In some examples, at least one recognized operator within recognized operators 114 comprises a decision tree. A decision tree is a graph that uses a branching method to illustrate every possible outcome of a decision. Parser 112 also identifies parameters within ML pipeline 130 and extracts them into parameters 115 for later possible use within translated NN 150. In some examples, parser 112 also determines, based at least on dependencies 113, a starting operator for translation, wherein the starting operator for translation is the earliest recognized operator having parameters. In some examples, the operators (even if recognized) that are upstream of the earliest recognized operator having parameters are not translated. In this manner, based at least on determining the earliest recognized operator having parameters, translation framework 110 does not translate operators upstream to the starting operator for translation.

In some examples, parser 112 determines whether a recognized operator within recognized operators 114 is trainable or non-trainable, and based at least on determining whether a recognized operator is trainable or non-trainable, flagging any parameters related to the recognized operator correspondingly for training. These are indicated within flags 119. Non-trainable operators have no parameters to estimate, and therefore might not experience an improvement in accuracy improvement backpropagation. In some examples, module selection component 116 determines whether a recognized operator has multiple corresponding NN modules indicated within the translation dictionary. In some examples, based at least on determining that a recognized operator has multiple corresponding NN modules, module selection component 116 selects the corresponding NN module based at least on one factor selected from the list consisting of: data type, data value, and other operators within ML pipeline 130 (for example, as indicated in recognized operators 114).

In some examples, NN wiring component 118 connects inputs of translated NN 150 to upstream operators of the ML pipeline that had not been translated. In some examples, NN training component 160 tunes (further trains) translated NN 150 with training data 140b. In some examples, tuning translated NN 150 comprises end-to-end tuning using backpropagation. In some examples, translated NN 150 is deployed to a GPU, for example on computing device 900 and/or a cloud resource 928.

Figure 2:
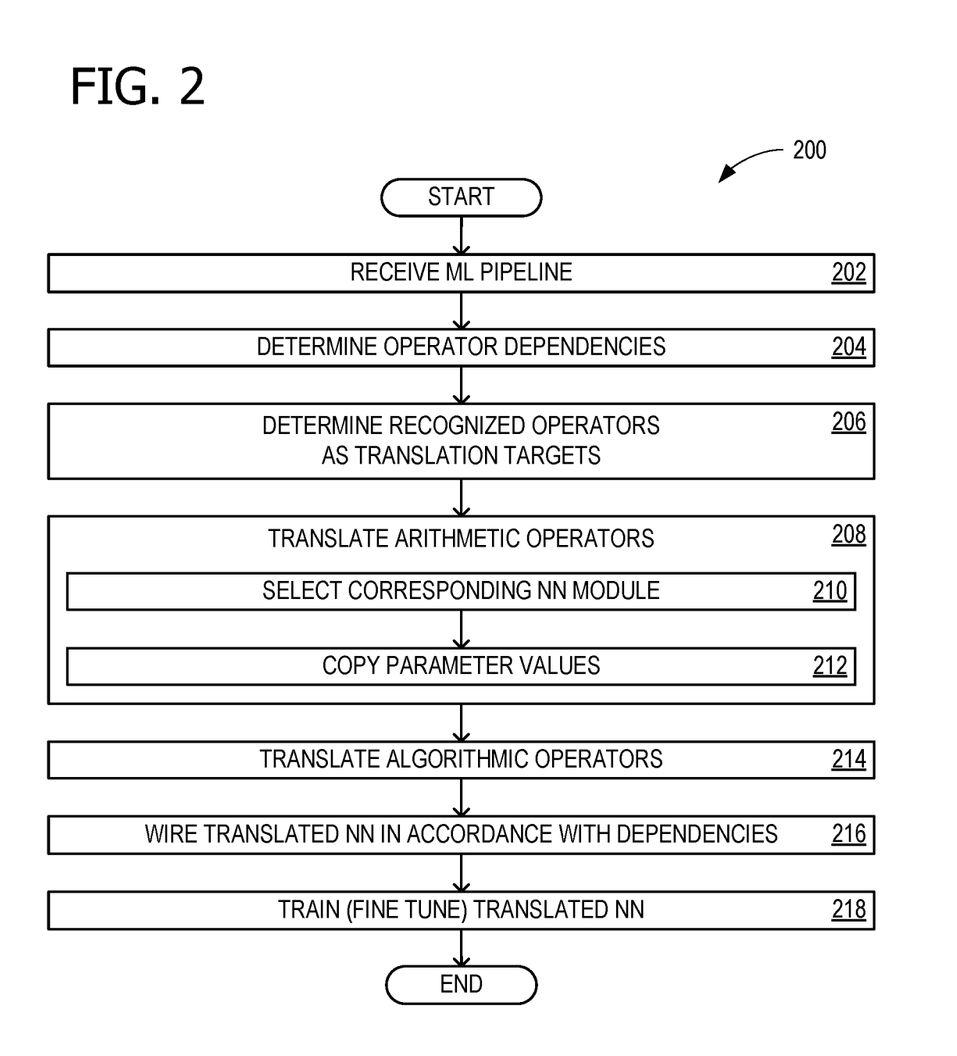
FIG. 2 is a flow chart illustrating exemplary operations involved in adapting ML models to NNs as performed by the framework of FIG. 1.

FIG. 2 is a flow chart illustrating exemplary operations involved in adapting ML models to NNs. In some examples, operations described for flow chart 200 are performed by computing device 900 of FIG. 9. Flow chart 200 commences with operation 202, which includes receiving ML pipeline 130 comprising a plurality of operators. Operation 204 includes determining operator dependencies 113 within ML pipeline 130. Operation 206 includes determining a plurality of recognized operators 114 within the plurality of operators. Recognized operators 114 are identified as translation targets, although, in some examples, operators not having parameters that are upstream from the first operator having parameters are not translated. That is, in some examples, operation 206 includes determining, based at least on dependencies within the ML pipeline, a starting operator for translation, wherein the starting operator for translation is the earliest recognized operator having parameters. Some examples, however, translate all operators, including operators that do not contain parameters (e.g., operators that are not models), rather than translating only after a starting operator. Benefits of the translation in such scenarios include performance improvement of scoring, even when accuracy improvements are modest.

Operation 208 translates arithmetic operators leveraging module selection component 116 and translation dictionary 120, and includes operations 210 and 212. Operation 210 includes for each of at least two recognized operators, selecting a corresponding NN module from translation dictionary 120. In examples that begin translation with the earliest recognized operator having parameters, operation 210 includes based at least on determining the earliest recognized operator having parameters, not translating operators upstream to the starting operator for translation. In some examples, operation 210 includes determining whether a recognized operator within the plurality of recognized operators is trainable or non-trainable and based at least on determining whether a recognized operator is trainable or non-trainable, flagging any parameters related to the recognized operator correspondingly for training. That is, in some examples, parameters for non-trainable operators of ML pipeline 130 are not used for further training (tuning) of translated NN 150. In some examples, there are multiple translation options.

In such examples, operation 210 includes determining whether a recognized operator has multiple corresponding NN modules indicated within translation dictionary 120, and based at least on determining that a recognized operator has multiple corresponding NN modules, selecting the corresponding NN module based at least on one factor selected from the list consisting of: data type, data value, and other operators within ML pipeline 130. Thus, translation framework 110 determines trainable operators with tunable parameters and labels them as translation targets by parsing ML pipeline 130 and taking advantage of a mapping table 122 within translation dictionary 120. External mappings are provided to build translated NN 150 to essentially replace ML pipeline 130, forming a new DAG the mimics the structure of ML pipeline 130.

Operation 212 includes copying parameter values from parameters 115 (which had been extracted from ML pipeline 130) into the NN modules, so that translated NN 150 can leverage the existing training of ML pipeline 130. Additional detail for operation 208 is provided in relation to the description of FIG. 6. Operation 214 includes translating algorithmic operators, which also used module selection component 116 and translation dictionary 120, in some examples. In some examples, operation 214 includes rewriting the algorithm as a differentiable module or retaining it as is. Translation framework 110 is able to translate even non-differentiable ML models (such as decision trees) into a neural representation. Operation 216 includes wiring selected NN modules 117 in accordance with dependencies 113 to generate translated NN 150. In some examples, operation 216 includes connecting inputs of translated NN 150 to upstream operators (of ML pipeline 130) that had not been translated.

In general, an ML pipeline is defined as a DAG of data-processing operators, and these operators are mainly divided into two categories: arithmetic operators and algorithmic operators. Arithmetic operators are typically described by a single mathematical formula. These operators are, in turn, divided into two sub-categories of parametric and non-parametric operators. Non-parametric operators define a fixed arithmetic operation on their inputs; for example, the Sigmoid function can be seen as a non-parametric arithmetic operator. In contrast, parametric operators involve numerical parameters on the top of their inputs in calculating the operators' outputs. For example, an affine transform is a parametric arithmetic operator where the parameters consist of the affine weights and biases. The parameters of these operators can be potentially tuned via some training procedure. The algorithmic operators, on the other hand, are those whose operation is not described by a single mathematical formula but rather by an algorithm. For example, an operator that converts categorical features into one-hot vectors is an algorithmic operator that mainly implements a look-up operation. The final output of the above translation process is an NN that typically provides the same prediction results as the original ML pipeline with the same the inputs.

Operation 218 includes tuning translated NN 150 with training data 142b. In some examples, tuning translated NN 150 comprises end-to-end tuning of the translated NN using backpropagation and computing the gradients of the final loss with respect to all tunable parameters. In some examples parameters are updated using gradient descent. This includes compute gradients of the final loss with respect to the parameters (copied from parameters 115). Multiple options are available for training parameters by gradient descent. These include: leaf node values, decision threshold values, canonical basis vectors (e.g., weights between the input and first hidden layer), and all the weights (including zero weights) between the first and second hidden layers. Such information is typically specific to the tree translation, and other operators will generally have different parameters and might not have two 2 hidden layers.

By fine-tuning the resulting NN on the original training data, it can be possible to improve the generalization of the model, since all operators are being jointly optimized toward the final loss function. Alternatively, once the translation is complete, the resulting network can be fine-tuned toward a completely different objective that is more suitable for a given application. Further, fine-tuning can be used to adapt the model to new data that were not available previously.

Using this approach, trained ML pipelines are translated into NNs and fine-tuned. Each ML pipeline is translated into a different translated NN, and operators that are shared within different ML pipelines become NN components that are each wired into larger translated NNs. Backpropagation supersedes the greedy one-operator-at-a-time training model, and eventually improves accuracy. During the translation, information already acquired by training the original ML pipeline is retained and provides a useful parameter initialization for the translated NN, making the further training (tuning) of the translated NN more accurate and faster.

Figure 3:
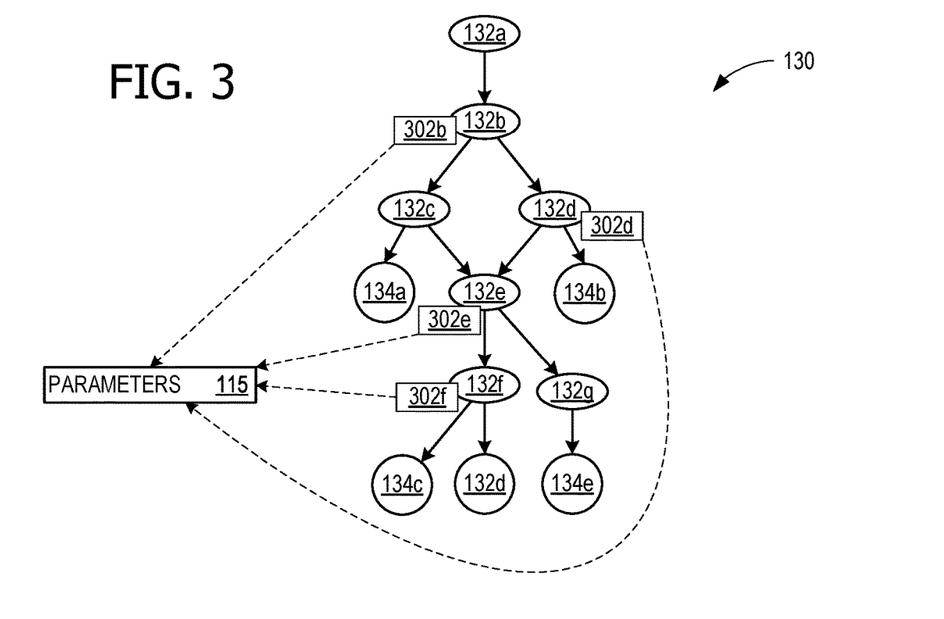
FIG. 3 illustrates an exemplary ML pipeline.

FIG. 3 illustrates further detail for exemplary ML pipeline 130. ML pipeline 130 includes an ensemble of ML models, implemented as operators 132a-132g, with dependencies as shown. Dependency information among operators 132a-132g is captured by dependencies 113 (of FIG. 1). Decision tree leaves 134a-134e are also shown as outputs of various operators that comprise decision trees. Operators 132b, 132d, 132e, and 132f each have parameters 302b, 302d, 302e, and 302f, respectively, which are copied into parameters 115 for later use in translated NN 150 (of FIG. 1).

Operator 132a does not have any associated parameters, so in some examples, operator 132a is not translated. Operator 132b is the earliest recognized operator having parameters, so operator 132b is the starting operator for translation, in some examples. In some examples, operators 132b through 132g are all translated, including operators 132c and 132g because, even though operators 132c and 132g do not have parameters, they logically follow operator 132b. Some of parameters 302b, 302d, 302e, and 302f may be trainable, and some may be non-trainable. Those that are non-trainable will not be included in later training (tuning or fine-tuning) of translated NN 150, as tracked by flags 119 (of FIG. 1), in some examples.

Figure 4:
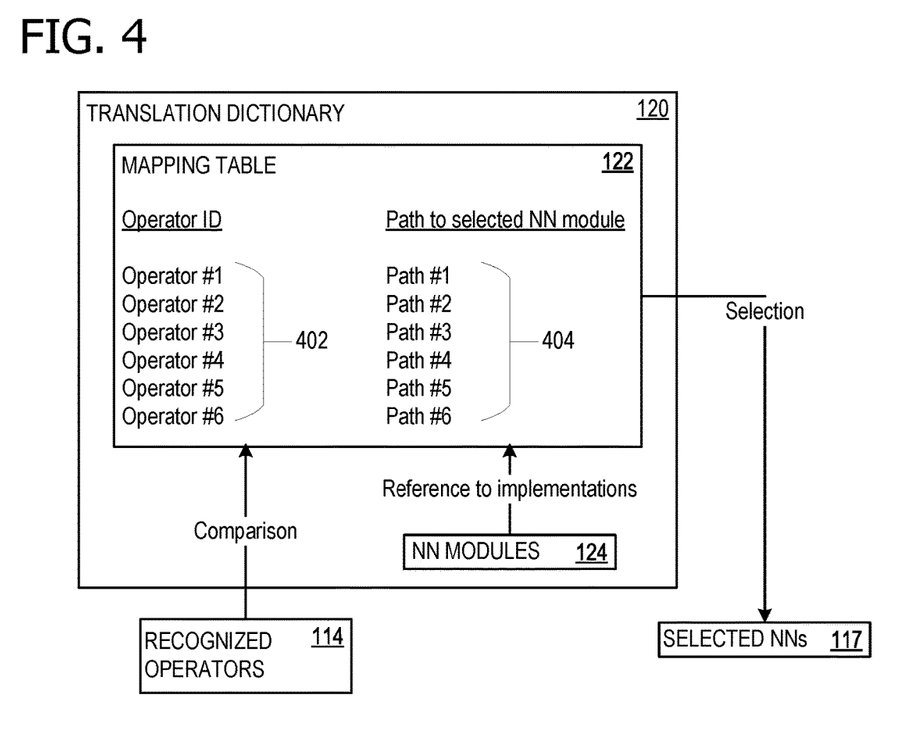
FIG. 4 illustrates structure of an exemplary mapping table for a translation dictionary.

FIG. 4 illustrates structure of exemplary mapping table 122 for translation dictionary 120. Recognized operators 114 are compared with one of Operator IDs 402, which are each paired with a path (one of paths 404) to an NN module within set of NN modules 124. Reference paths 404 point to the actual implementations within set of NN modules 124. In some examples, the actual implementations within set of NN modules 124 are coded by developers, although automated generation is possible, in some examples. As new translations are created, the translations are added to translation dictionary 120 by placing the new NN modules in NN modules 124 and a new reference entry in mapping table 122.

In some examples, mapping table 122 holds multiple options for a particular operator, and module selection component 116 selects among the multiple options, for example, based at least on data type, data values, other operators present within the ML pipeline (e.g., the preceding and/or following operators), or some other selection criteria. After look-up of a specific operator within mapping table 122, the proper corresponding NN module is selected and becomes one of selected NNs 117 for use when wiring translated NN 150.

Figure 5:
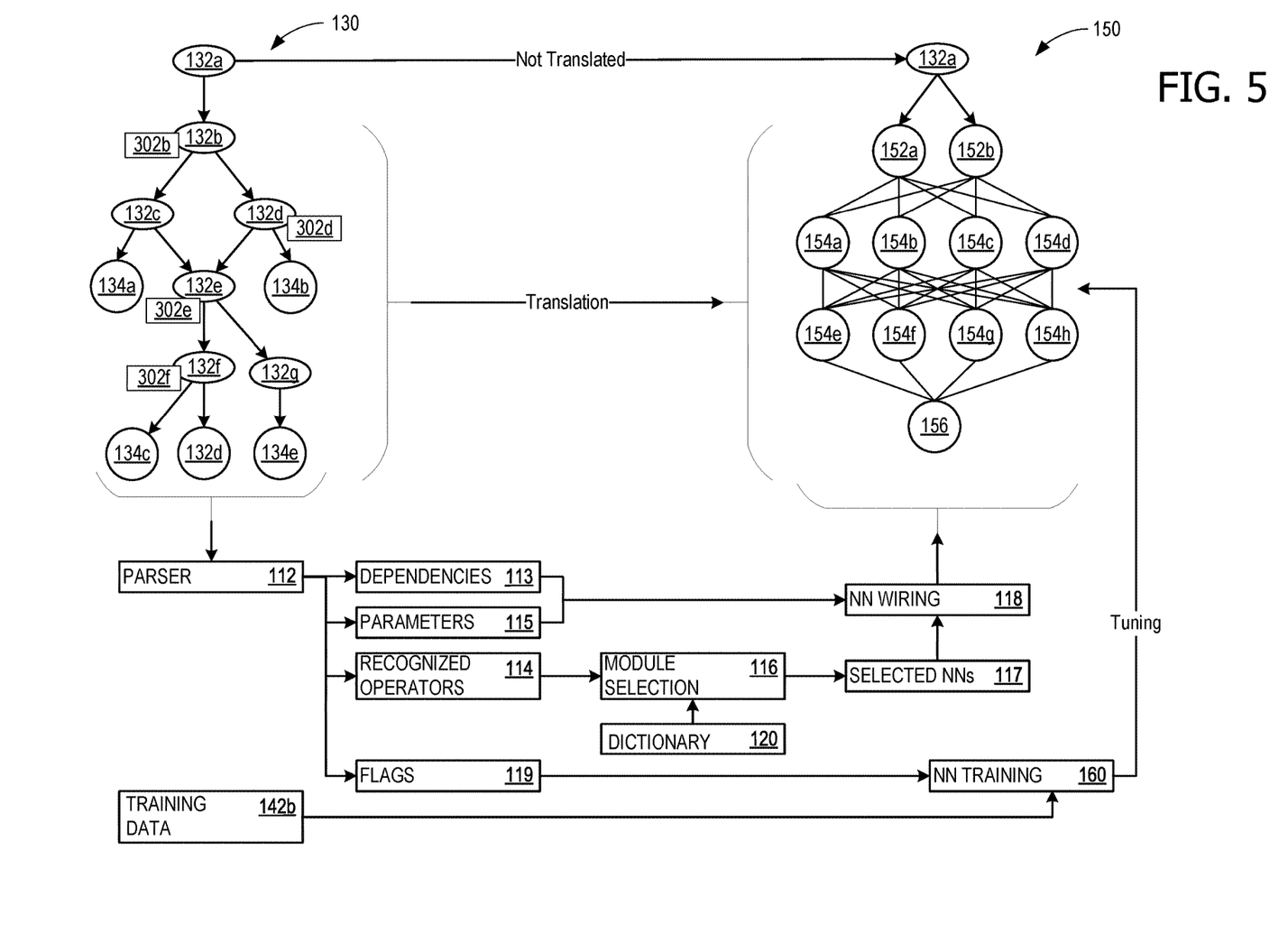
FIG. 5 illustrates a notional translation of an ML pipeline to a translated NN.

FIG. 5 illustrates a notional translation of ML pipeline 130 to translated NN 150, having input nodes 152a and 152b, intermediary nodes 154a-154h, and output node 156 that had been generated with the translation described herein. Because operator 132a does not have any parameters, and is upstream of operators 132b-132g, it is not translated in the illustrated example, but is rather copied and wired (connected) to input nodes 152a and 152b. Some examples, however, translate all operators, including operators that do not contain parameters (e.g., operators that are not models), rather than translating only after a starting operator. As shown parser 112 parses ML pipeline 130 to determine dependencies 113, parameters 115, recognized operators 114, and flags 119. Module selection component 116 intakes recognized operators 114 and uses translation dictionary 120 (as described in relation to FIG. 4) to produce selected NNs 117. NN wiring component 118 uses dependencies 113, parameters 115, and selected NNs 117 to wire translated NN 150. NN training component 160 uses flags 119 and training data 142b to tune translated NN 150.

Figure 6:
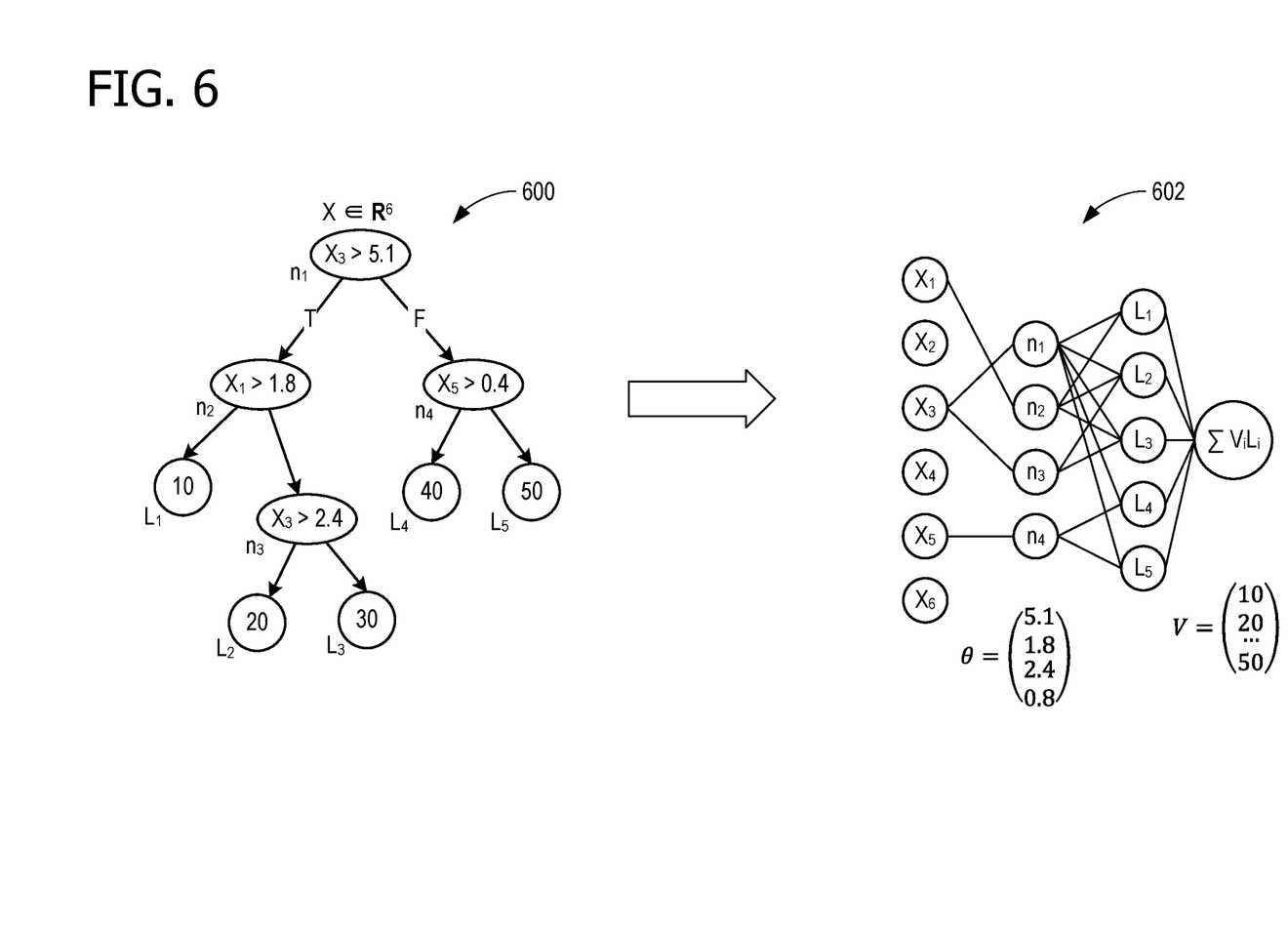
FIG. 6 illustrates a notional translation of a decision tree involving arithmetic operators to an NN module.

FIG. 6 illustrates a notional translation of a decision tree 600 involving algorithmic operators to an NN module 602. For decision tree 600, a maximum margin hyperplane between true and false is given by the line $n_1+n_2=1.5$, with points above the line having a state of true, and points below the line having a state of false. The values and structure of decision tree 600 are translated into NN module 602, as shown, which will produce the same output as decision tree 600.

Figure 7:
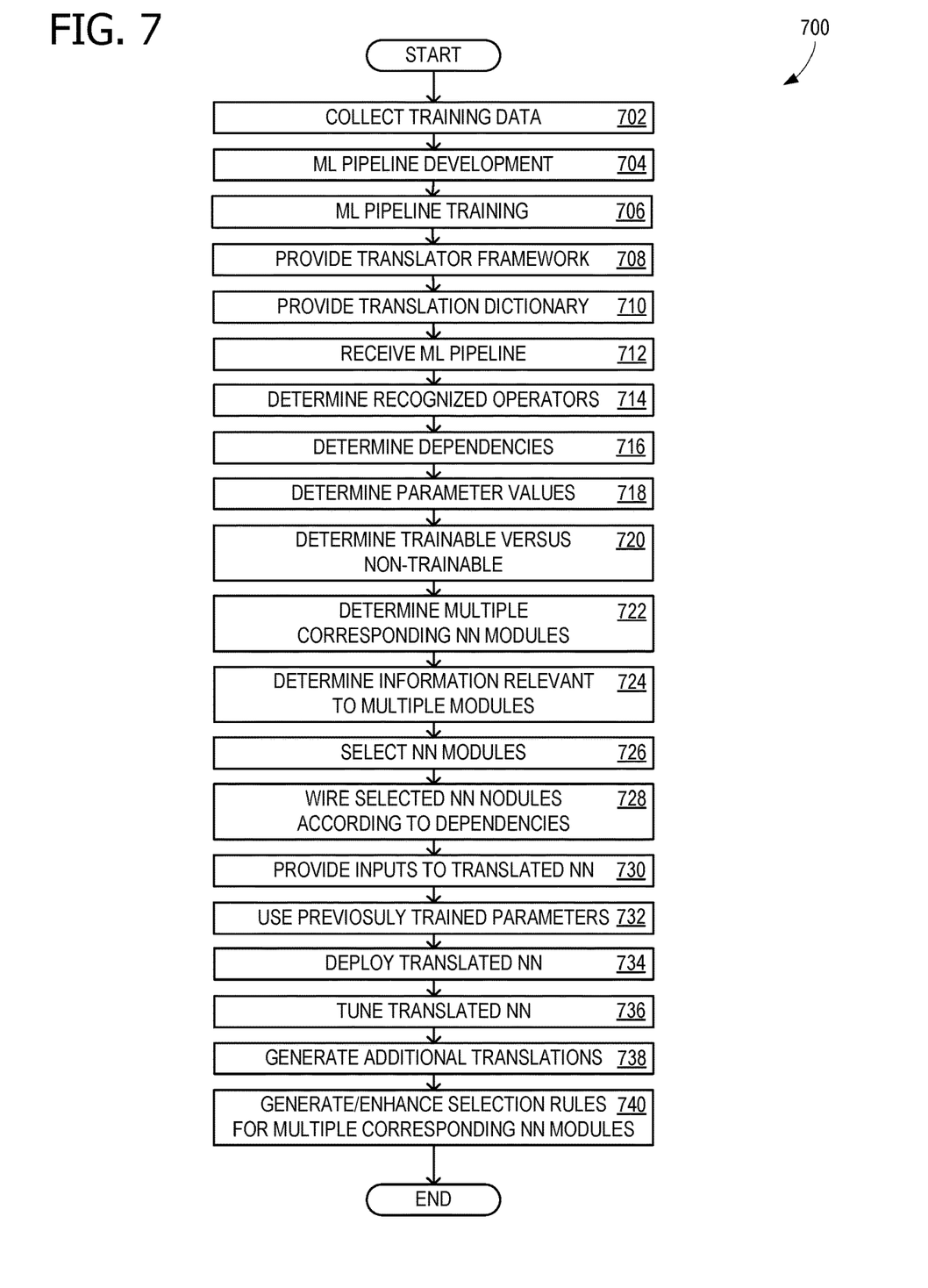
FIG. 7 is a flow chart illustrating exemplary operations involved in adapting ML models to NNs as performed by the framework of FIG. 1.

FIG. 7 is a flow chart illustrating exemplary operations involved in adapting ML models to NNs. In some examples, operations described for flow chart 700 are performed by computing device 900 of FIG. 9. Flow chart 700 commences with operation 702, which includes 702 collecting training data for the ML pipeline and the translated NN. Operation 704 includes the development of the ML pipeline, which is trained in operation 706. The translation framework is provided in operation 708, and the translation directory is provided in operation 710. Operation 712 includes the translation framework receiving the ML pipeline. Operation 714 includes parsing the ML pipeline to determine recognized operators having a corresponding NN module in the translation dictionary. Operation 716 includes parsing the ML pipeline to determine dependencies (DAG structure). Operation 718 includes parsing the ML pipeline to determine parameter values, and operation 720 includes parsing the ML pipeline to determine trainable versus non-trainable parameters (trainable versus non-trainable operators). The trainability of the parameters (and thus the operators and resulting NN modules) is flagged for later training purposes.

Operation 722 includes determining whether a recognized operator has multiple corresponding NN modules, and if so, operation 724 includes determining information relevant to selecting a particular NN module from the multiple corresponding NN modules. In some examples, this includes the data type and values being operated upon, and/or other operators within the ML pipeline. Operation 726 includes selecting NN modules from the translation dictionary for recognized operators. For scenarios in which an operator has multiple corresponding NN modules, the information collected in operation 724 is used to select a particular NN module. Operation 728 includes wiring the selected NN nodules according to the extracted dependencies. In some examples, operation 728 also includes connecting non-translated operators that are upstream from the first (starting) translated operator. This generates the translated NN.

Operation 730 includes providing the inputs of the ML pipeline to the translated NN. Operation 732 includes using the previously trained parameters (extracted during operation 718) with the translated NN. Some examples use default or random parameters, instead. Operation 734 includes deploying the translated NN, for example to a GPU. Operation 736 includes tuning the translated NN with additional training. In some examples, during training, when there is back propagation, flagged non-trainable parameters (non-trainable modules) are not trained. Operation 738 includes generating additional translations (NN modules) for the translation dictionary, and operation 740 includes generating or enhancing selection rules for scenarios in which a recognized operator has multiple corresponding NN modules.

Figure 8:
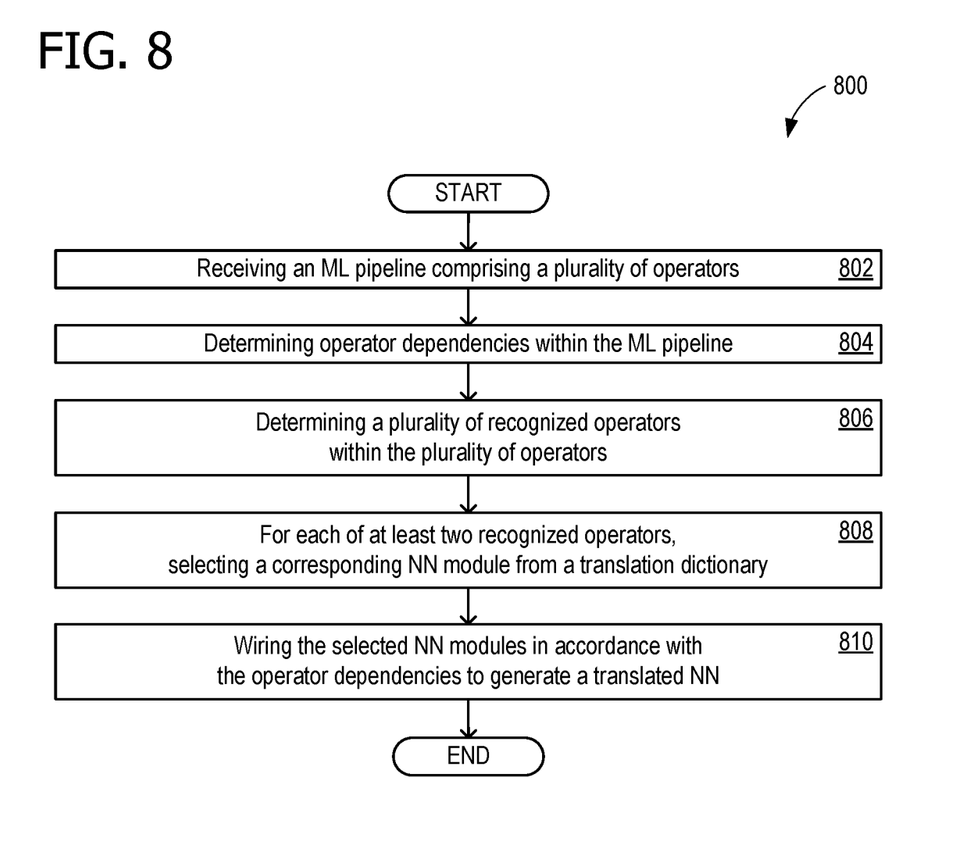
FIG. 8 is another flow chart illustrating exemplary operations involved in adapting ML models to NNs as performed by the framework of FIG. 1.

FIG. 8 is a flow chart illustrating exemplary operations involved in adapting ML models to NNs. In some examples, operations described for flow chart 800 are performed by computing device 900 of FIG. 9. Flow chart 800 commences with operation 802, which includes receiving an ML pipeline comprising a plurality of operators. Operation 804 includes determining operator dependencies within the ML pipeline. Operation 806 includes determining a plurality of recognized operators within the plurality of operators. Operation 808 includes for each of at least two recognized operators, selecting a corresponding NN module from a translation dictionary. Operation 810 includes wiring the selected NN modules in accordance with the operator dependencies to generate a translated NN.

ADDITIONAL EXAMPLES

Some aspects and examples disclosed herein are directed to a system for adapting ML models to NNs comprises: a processor; and a computer-readable medium storing instructions that are operative upon execution by the processor to: receive an ML pipeline comprising a plurality of operators; determine operator dependencies within the ML pipeline; determine a plurality of recognized operators within the plurality of operators; for each of at least two recognized operators, select a corresponding NN module from a translation dictionary; and wire the selected NN modules in accordance with the operator dependencies to generate a translated NN.

Additional aspects and examples disclosed herein are directed to a method of adapting ML models to NNs comprises: receiving an ML pipeline comprising a plurality of operators; determining operator dependencies within the ML pipeline; determining a plurality of recognized operators within the plurality of operators; for each of at least two recognized operators, selecting a corresponding NN module from a translation dictionary; and wiring the selected NN modules in accordance with the operator dependencies to generate a translated NN.

Additional aspects and examples disclosed herein are directed to one or more computer storage devices having computer-executable instructions stored thereon for adapting ML models to NNs, which, on execution by a computer, cause the computer to perform operations comprising: receiving an ML pipeline comprising a plurality of operators; determining operator dependencies within the ML pipeline; determining a plurality of recognized operators within the plurality of operators; for each of at least two recognized operators, selecting a corresponding NN module from a translation dictionary; and wiring the selected NN modules in accordance with the operator dependencies to generate a translated NN.

Alternatively, or in addition to the other examples described herein, examples include any combination of the following:
- determining, based at least on dependencies within the ML pipeline, a starting operator for translation, wherein the starting operator for translation is an earliest recognized operator having parameters;
- based at least on determining the earliest recognized operator having parameters, not translating operators upstream to the starting operator for translation;
- connecting inputs of the translated NN to upstream operators of the ML pipeline that had not been translated;
- tuning the translated NN with training data;
- tuning the translated NN comprises end-to-end tuning of the translated NN using backpropagation;
- determining whether a recognized operator within the plurality of recognized operators is trainable or non-trainable;
- based at least on determining whether a recognized operator is trainable or non-trainable, flagging any parameters related to the recognized operator correspondingly for training;
- determining whether a recognized operator has multiple corresponding NN modules indicated within the translation dictionary;
- based at least on determining that a recognized operator has multiple corresponding NN modules, selecting the corresponding NN module based at least on one factor selected from the list consisting of: data type, data value, and other operators within the ML pipeline;
- at least one recognized operator comprises a decision tree;
- deploying the translated NN to a graphics processing unit (GPU);
- using translated models for predictions; and
- using translation to facilitate distributed training.

While the aspects of the disclosure have been described in terms of various examples with their associated operations, a person skilled in the art would appreciate that a combination of operations from any number of different examples is also within scope of the aspects of the disclosure.

Example Operating Environment

Figure 9:
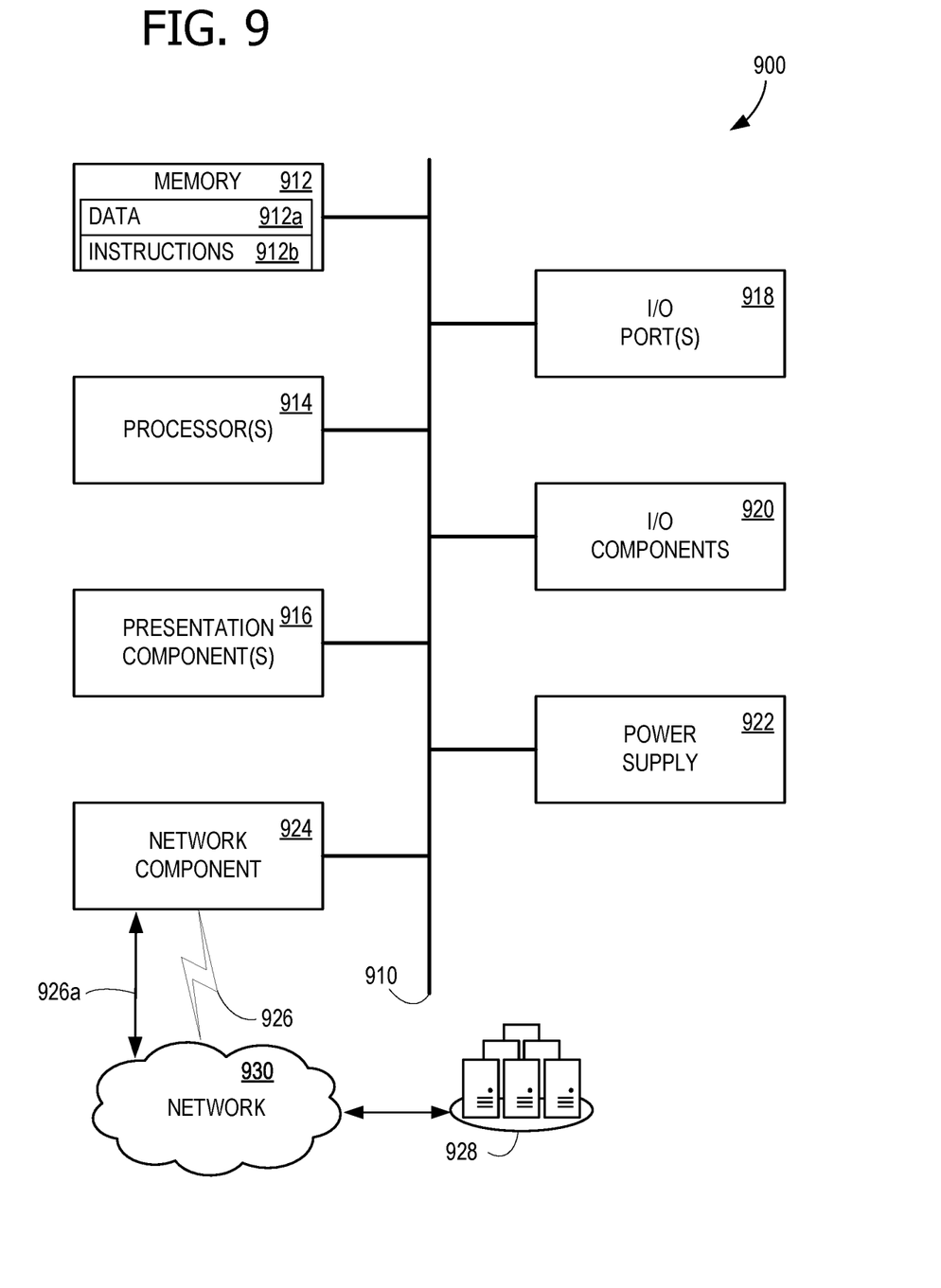
FIG. 9 is a block diagram of an example computing environment suitable for implementing some of the various examples disclosed herein.

FIG. 9 is a block diagram of an example computing device 900 for implementing aspects disclosed herein, and is designated generally as computing device 900. Computing device 900 is but one example of a suitable computing environment and is not intended to suggest any limitation as to the scope of use or functionality of the examples disclosed herein. Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer-storage memory 912, one or more processors 914, one or more presentation components 916, I/O ports 918, I/O components 920, a power supply 922, and a network component 924. While computing device 900 is depicted as a seemingly single device, multiple computing devices 900 may work together and share the depicted device resources. For example, memory 912 may be distributed across multiple devices, and processor(s) 914 may be housed with different devices.

Bus 910 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer-storage media references below and operatively provide storage of computer-readable instructions, data structures, program modules and other data for computing device 900. In some examples, memory 912 stores one or more of an operating system, a universal application platform, or other program modules and program data. Memory 912 is thus able to store and access data 912a and instructions 912b that are executable by processor 914 and configured to carry out the various operations disclosed herein.

In some examples, memory 912 includes computer-storage media in the form of volatile and/or nonvolatile memory, removable or non-removable memory, data disks in virtual environments, or a combination thereof. Memory 912 may include any quantity of memory associated with or accessible by computing device 900. Memory 912 may be internal to computing device 900 (as shown in FIG. 9), external to computing device 900 (not shown), or both (not shown). Examples of memory 912 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 900. Additionally, or alternatively, memory 912 may be distributed across multiple computing devices 900, for example, in a virtualized environment in which instruction processing is carried out on multiple computing devices 900. For the purposes of this disclosure, "computer storage media," "computer-storage memory," "memory," and "memory devices" are synonymous terms for computer-storage memory 912, and none of these terms include carrier waves or propagating signaling.

Processor(s) 914 may include any quantity of processing units that read data from various entities, such as memory 912 or I/O components 920, and may include CPUs and/or GPUs. Specifically, processor(s) 914 are programmed to execute computer-executable instructions for implementing aspects of the disclosure. The instructions may be performed by the processor, by multiple processors within computing device 900, or by a processor external to client computing device 900. In some examples, processor(s) 914 are programmed to execute instructions such as those illustrated in the flow charts discussed below and depicted in the accompanying drawings. Moreover, in some examples, processor(s) 914 represent an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

Computing device 900 may operate in a networked environment via network component 924 using logical connections to one or more remote computers. In some examples, network component 924 includes a network interface card and/or computer-executable instructions (e.g., a driver) for operating the network interface card. Communication between computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link 926a to a cloud resource 928 across network 930. Various different examples of communication links 926 and 926a include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for adapting machine learning (ML) models to neural networks (NNs), the system comprising:
   a processor; and
   a computer-readable medium storing instructions that are operative upon execution by the processor to:
      receive an ML pipeline comprising a plurality of operators;
      determine operator dependencies within the ML pipeline;
      determine a plurality of recognized operators within the plurality of operators;
      for each of at least two recognized operators, select a corresponding NN module from a plurality of corresponding NN modules within a translation dictionary based on data value or other operators within the ML pipeline; and
      wire the selected NN modules in accordance with the operator dependencies to generate a translated NN.

2. The system of claim 1, wherein the instructions are further operative to:
   determine, based at least on dependencies within the ML pipeline, a starting operator for translation, wherein the starting operator for translation is an earliest recognized operator having parameters; and
   based at least on determining the earliest recognized operator having parameters, not translate operators upstream to the starting operator for translation.

3. The system of claim 1, wherein the instructions are further operative to:
   connect inputs of the translated NN to upstream operators of the ML pipeline that had not been translated.

4. The system of claim 1, wherein the instructions are further operative to:
   compare each recognized operator from the set of recognized operators to an operator identification (ID) from a set of operator IDs, wherein each operator ID of the set of operator IDs is paired with a path to an NN module.

5. The system of claim 1, wherein the instructions are further operative to:
   tune the translated NN with training data, wherein tuning the translated NN comprises end-to-end tuning of the translated NN using backpropagation.

6. The system of claim 1, wherein the instructions are further operative to:
   determine whether a recognized operator within the plurality of recognized operators is trainable or non-trainable; and
   based at least on determining whether a recognized operator is trainable or non-trainable, flag any parameters related to the recognized operator correspondingly for training.

7. The system of claim 6, wherein parameters flagged as non-trainable are not included in tuning of the translated NN.

8. A method of adapting machine learning (ML) models to neural networks (NNs), the method comprising:
   receiving an ML pipeline comprising a plurality of operators;
   determining operator dependencies within the ML pipeline;
   determining a plurality of recognized operators within the plurality of operators;
   for each of at least two recognized operators, selecting a corresponding NN module from a plurality of corresponding NN modules within a translation dictionary based on data value or other operators within the ML pipeline; and
   wiring the selected NN modules in accordance with the operator dependencies to generate a translated NN.

9. The method of claim 8, further comprising:
   determining, based at least on dependencies within the ML pipeline, a starting operator for translation, wherein the starting operator for translation is an earliest recognized operator having parameters; and
   based at least on determining the earliest recognized operator having parameters, not translating operators upstream to the starting operator for translation.

10. The method of claim 8, further comprising:
    connecting inputs of the translated NN to upstream operators of the ML pipeline that had not been translated.

11. The method of claim 8, further comprising:
    comparing each recognized operator from the set of recognized operators to an operator identification (ID) from a set of operator IDs, wherein each operator ID of the set of operator IDs is paired with a path to an NN module.

12. The method of claim 8, further comprising:
    tuning the translated NN with training data, wherein tuning the translated NN comprises end-to-end tuning of the translated NN using backpropagation.

13. The method of claim 8, further comprising:
- determining whether a recognized operator within the plurality of recognized operators is trainable or non-trainable; and
- based at least on determining whether a recognized operator is trainable or non-trainable, flagging any parameters related to the recognized operator correspondingly for training.

14. The method of claim 13, wherein parameters flagged as non-trainable are not included in tuning of the translated NN.

15. One or more computer storage devices having computer-executable instructions stored thereon for adapting machine learning (ML) models to neural networks (NNs), which, on execution by a computer, cause the computer to perform operations comprising:
- receiving an ML pipeline comprising a plurality of operators;
- determining operator dependencies within the ML pipeline;
- determining a plurality of recognized operators within the plurality of operators;
- for each of at least two recognized operators, selecting a corresponding NN module from a plurality of corresponding NN modules within a translation dictionary based on data value or other operators within the ML pipeline; and
- wiring the selected NN modules in accordance with the operator dependencies to generate a translated NN.

16. The one or more computer storage devices of claim 15, wherein the operations further comprise:
- determining, based at least on dependencies within the ML pipeline, a starting operator for translation, wherein the starting operator for translation is an earliest recognized operator having parameters;
- based at least on determining the earliest recognized operator having parameters, not translating operators upstream to the starting operator for translation; and
- connecting inputs of the translated NN to upstream operators of the ML pipeline that had not been translated.

17. The one or more computer storage devices of claim 15, wherein the operations further comprise:
- tuning the translated NN with training data, wherein tuning the translated NN comprises end-to-end tuning of the translated NN using backpropagation.

18. The one or more computer storage devices of claim 15, wherein the operations further comprise:
- determining whether a recognized operator within the plurality of recognized operators is trainable or non-trainable;
- based at least on determining whether a recognized operator is trainable or non-trainable, flagging any parameters related to the recognized operator correspondingly for training, wherein parameters flagged as non-trainable are not included in tuning of the translated NN.

19. The one or more computer storage devices of claim 15, wherein at least one recognized operator comprises a decision tree.

20. The one or more computer storage devices of claim 15, wherein the operations further comprise:
- deploying the translated NN to a graphics processing unit (GPU).

\* \* \* \* \*